United States Patent [19]

Bisognin et al.

[11] Patent Number: 6,004,497
[45] Date of Patent: Dec. 21, 1999

[54] PROCESS FOR COVERING A PLASTICS PART WITH A FOIL CUT DURING THE PROCESS

[75] Inventors: Julien Bisognin, Andeville; Ivan Baudouin, Paris; Sébastien Trillat, Poissy, all of France

[73] Assignee: Allibert Industrie (societe en nom collectif), France

[21] Appl. No.: 08/853,912

[22] Filed: May 5, 1997

[30] Foreign Application Priority Data

May 10, 1996 [FR] France ................................ 96 05858
Apr. 18, 1997 [EP] European Pat. Off. ............ 97 400 879

[51] Int. Cl.⁶ .................................................. B29C 45/14
[52] U.S. Cl. ......................... 264/153; 264/156; 264/266; 264/273; 264/275; 425/120; 425/129.1
[58] Field of Search ................................. 264/154, 273, 264/266, 163, 155, 328.12, 156, 40.7, 275; 425/112, 120, 553, 129.1, 127

[56] References Cited

U.S. PATENT DOCUMENTS

| | | |
|---|---|---|
| 3,184,096 | 5/1965 | Cheeley . |
| 3,651,191 | 3/1972 | Glatt et al. ............................... 264/153 |
| 5,019,313 | 5/1991 | Warburton ............................. 264/154 |
| 5,147,591 | 9/1992 | Yoshida .................................. 264/163 |
| 5,629,029 | 5/1997 | Souder et al. .......................... 425/112 |

FOREIGN PATENT DOCUMENTS

| | | |
|---|---|---|
| 0428765 | 12/1972 | Australia . |
| 0043174 | 1/1982 | European Pat. Off. . |
| 0491682 | 6/1992 | European Pat. Off. . |
| 0636464 | 2/1995 | European Pat. Off. . |
| 0684120 | 11/1995 | European Pat. Off. . |
| 0724942 | 8/1996 | European Pat. Off. . |
| 2271956 | 5/1994 | United Kingdom . |

*Primary Examiner*—Jan H. Silbaugh
*Assistant Examiner*—Edmund H. Lee
*Attorney, Agent, or Firm*—Rothwell, Figg, Ernst & Kurz

[57] ABSTRACT

A process for substantially covering with at least one non-rigid decorative foil a visible face of a support part of plastic material, so as to obtain a finished part including a decorative inset, including the steps of a) inserting into the mould the foil having a decorative area with the foil having a decorative area, intended to form the inset, and a further area, b) closing the mould at least partially by moving the two mould parts together such that the foil creates a continuous separation of the moulding cavity into a first space and a second space, c) inside the moulding cavity, cutting at least one aperture in the foil at the location of the further area, such that the first and second spaces of the cavity are placed in fluid communication by the at least one aperture which henceforth interrupts the separation between these two spaces so as to enable the plastic material to pass through the at least one aperture, leaving a cut end of the foil in the moulding cavity, d) before and/or after steps b) and/or c), introducing plastics material into the mould cavity, and e) after step c), distributing the plastic material in the moulding cavity by passing it through the at least one aperture in order to obtain the decorative support part locally covered by the inset, wherein the cut end of the foil is immersed in the plastic material.

24 Claims, 8 Drawing Sheets

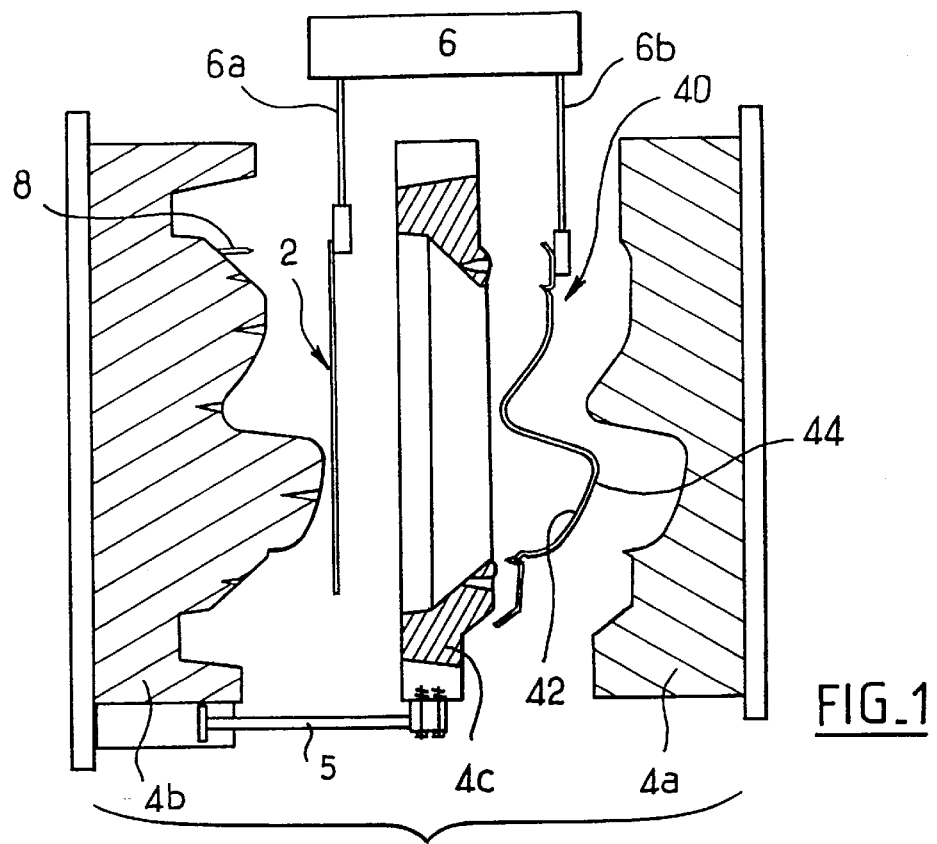
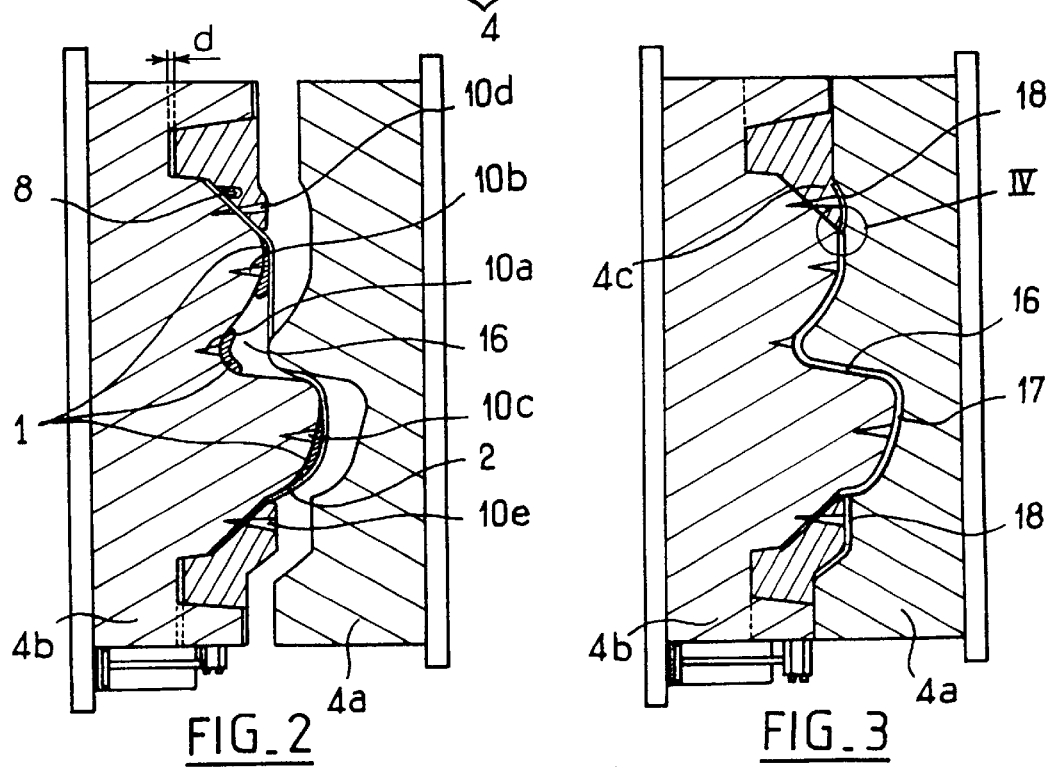

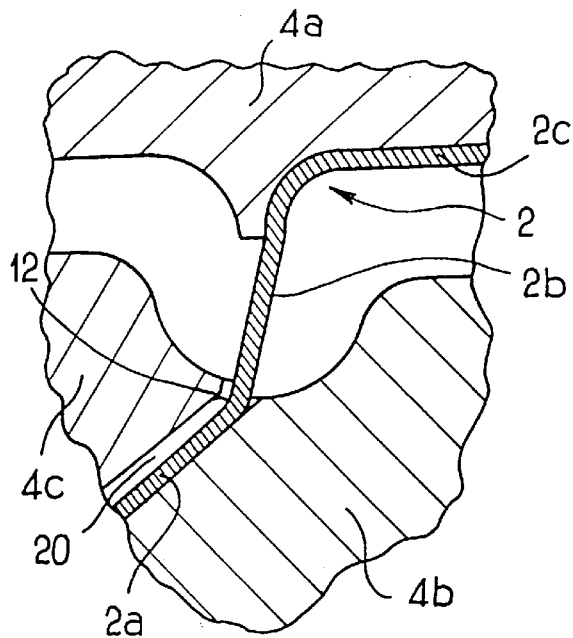
FIG_4
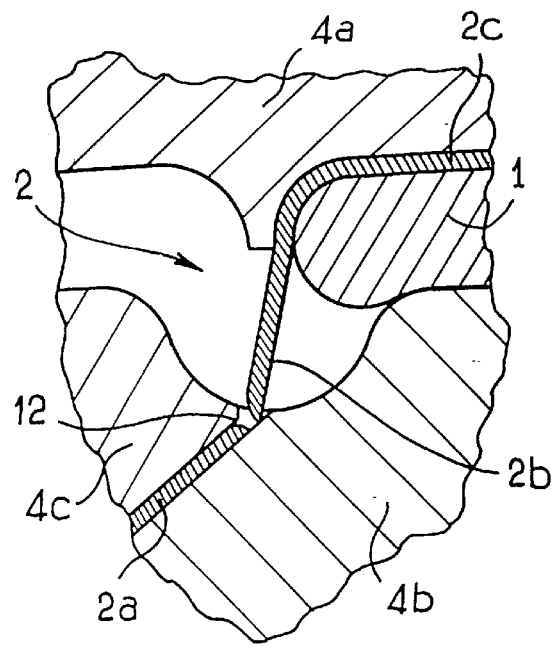
FIG_5
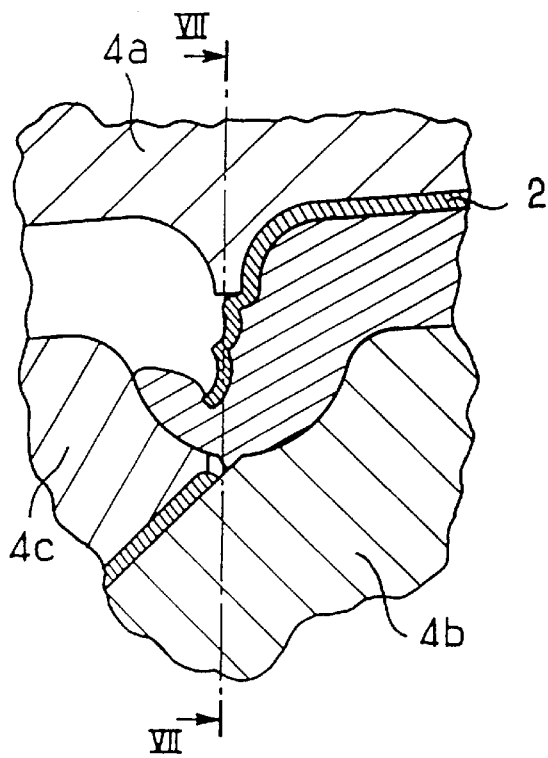
FIG_6
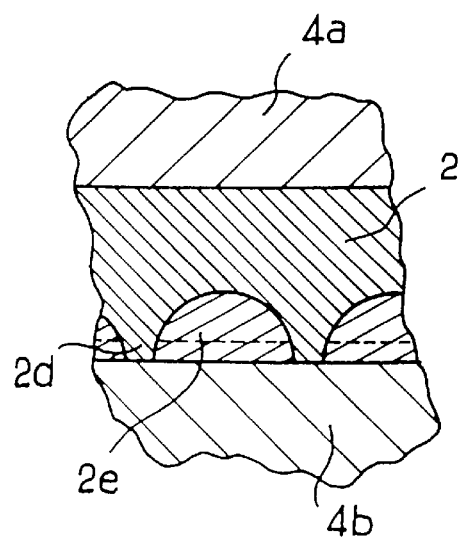
FIG_7

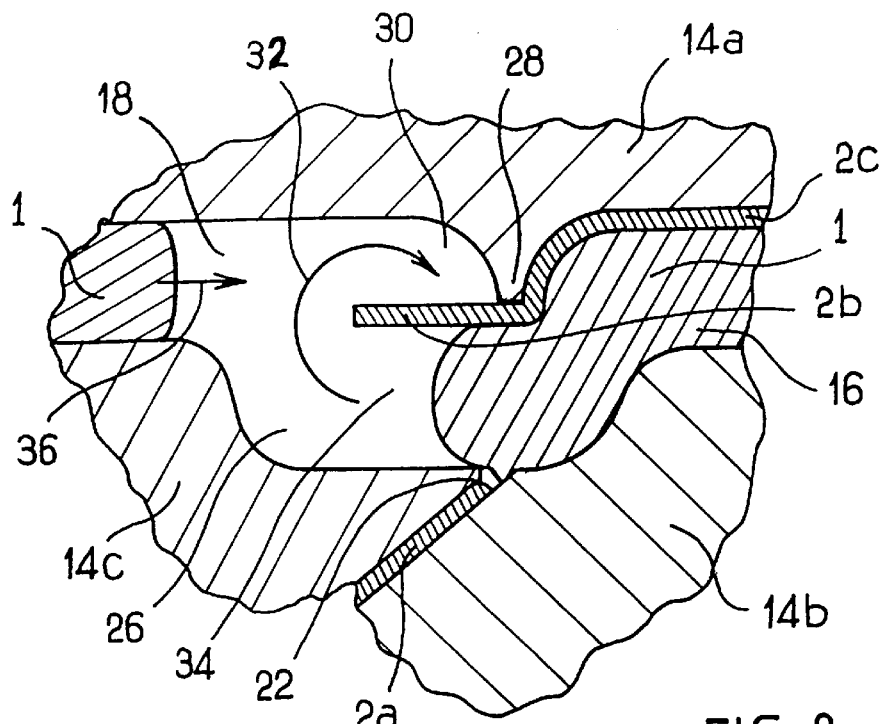
FIG_8
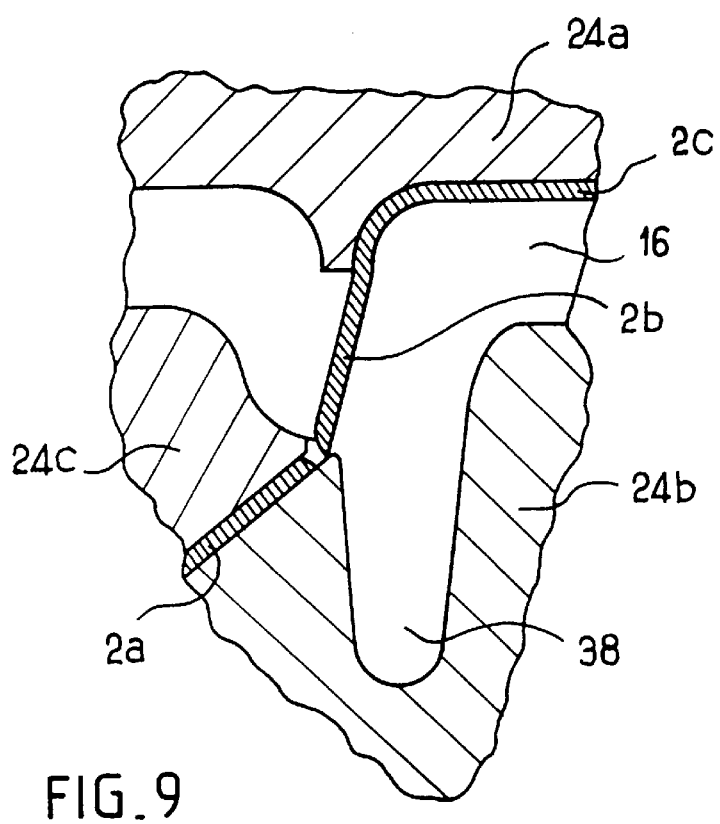
FIG_9

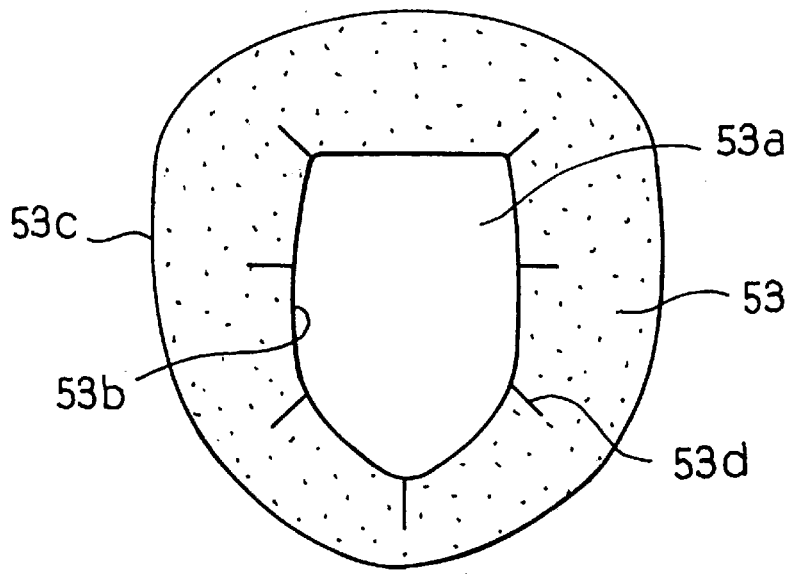
FIG_10
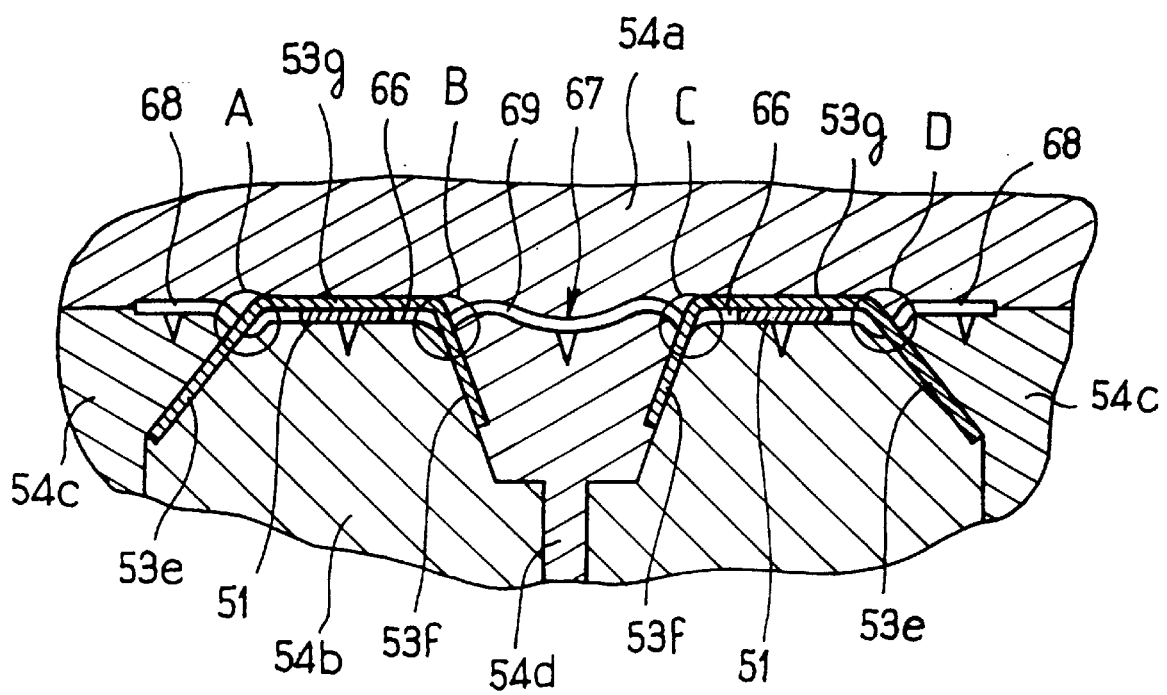
FIG_13

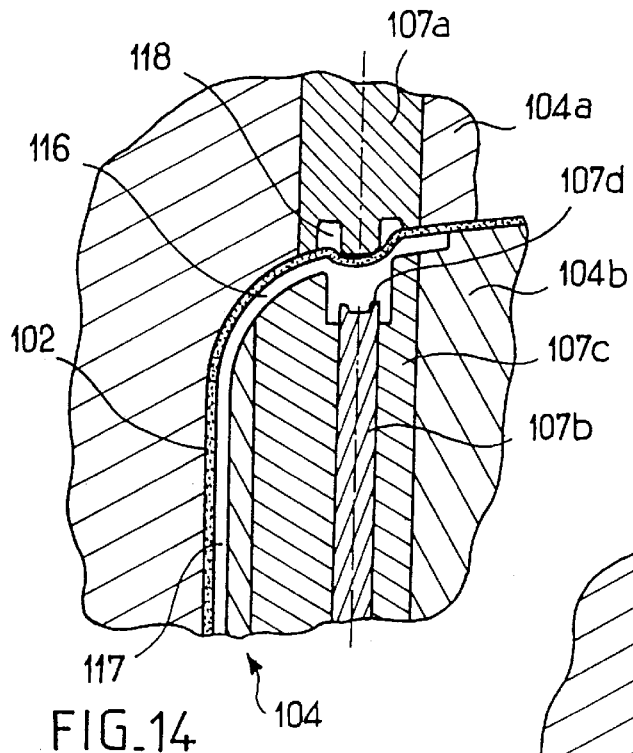
FIG_14
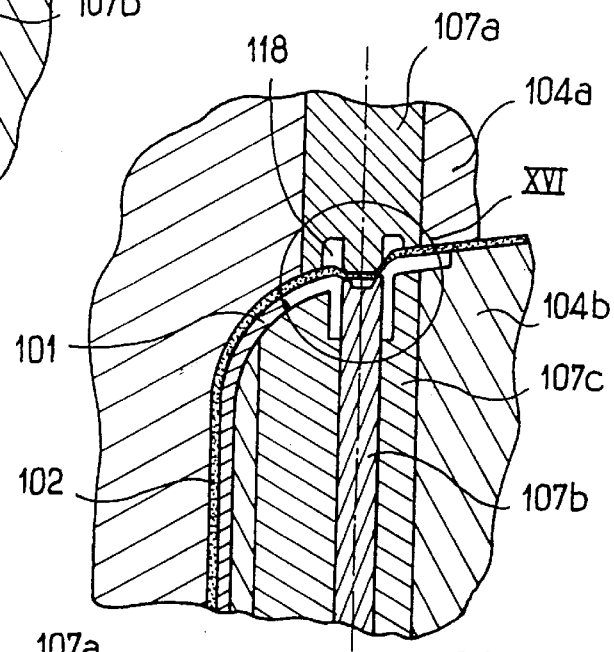
FIG_15
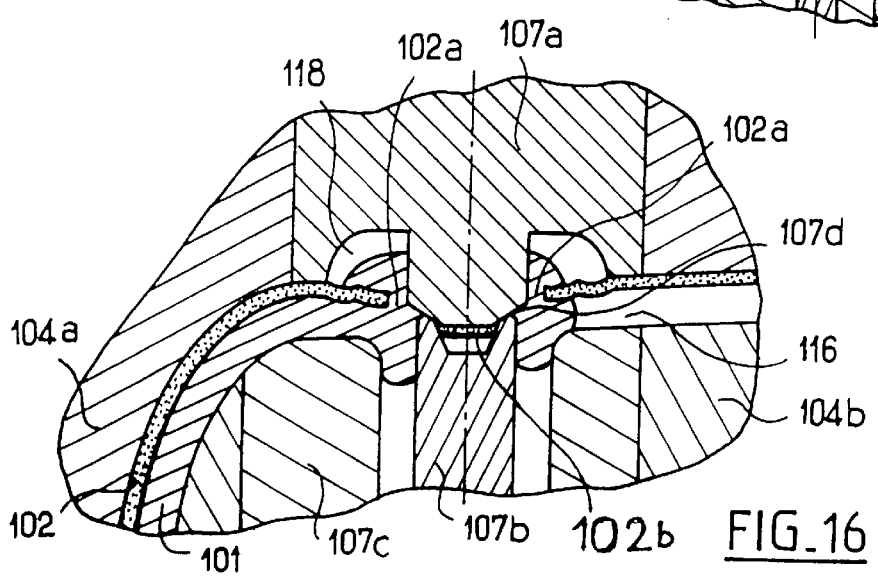
FIG_16

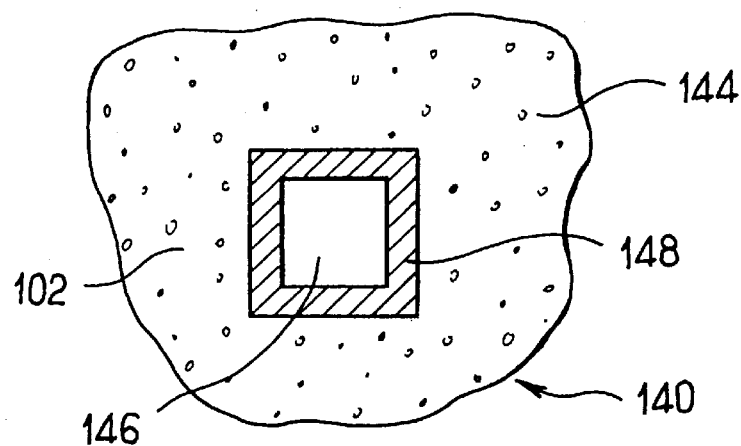
FIG_17
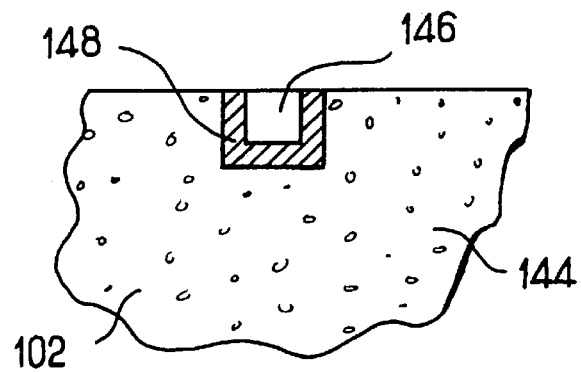
FIG_18
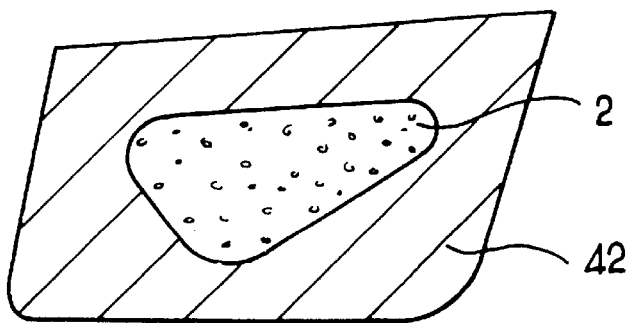
FIG_19

PROCESS FOR COVERING A PLASTICS PART WITH A FOIL CUT DURING THE PROCESS

The invention concerns a process for substantially covering with at least one non-rigid decorative foil (or sheet) a visible face of a support part of plastics material(s) in a mould substantially comprising a first and a second part which form a moulding cavity therebetween.

What is to be understood by a non-rigid foil or sheet is a flexible material (PVC, fabric or non-woven, etc.) which can comprise a layer of foam or the like but which is deformable. The foil may be shaped solely in the mould during the process in which the entire part is moulded or it may already have been pre-shaped beforehand such that, before the present process is implemented, the foil has an initial shape similar to that of the part of the mould with which it is to come into contact.

More particularly, the invention concerns the production of a finished part comprising a decorative inset which covers only a portion of the visible face. The problems inherent in this type of production generally consist in positioning the foil correctly, leaving only a specific portion of the foil showing on the finished part whilst permitting satisfactory cohesion between the portion covered by the decorative foil and the portion which is not covered.

In the following the visible portion of the foil on the finished part and forming part of the visible face will be known as the "inset". The portion of the support part not covered by the foil will be said to be "not moulded over" or "non-covered", whilst the portion located "below" the inset will be said to be "moulded over" or "covered".

In order to overcome the above problems, the invention proposes a process comprising the following steps:

a) inserting into the mould the foil which comprises a decorative area, intended to form the inset, and a further area;

b) closing the mould at least partially by moving its two parts together such that the foil creates a continuous separation of the moulding cavity into a first space and a second space;

c) cutting out inside the moulding cavity at least one aperture in the foil at the location of the further area, such that the first and second spaces of the cavity are placed in fluid communication by this aperture which henceforth interrupts the separation between these two spaces so as to enable the material to pass through this aperture;

d) before and/or after steps b) and/or c), introducing plastics material into the mould cavity;

e) after step c), distributing the material in the moulding cavity by passing it through the aperture in order to obtain the decorative support part locally covered by the inset;

f) cooling the part; and g) opening the mould and ejecting the finished part.

In this way, the problems posed by the wicking effect and the cohesion between the portions moulded over and not moulded over are largely overcome. The number and arrangement of the passages for the material passing through the foil structure can be controlled since they correspond to the locations where the cut-out is made. Moreover, since the cut-out in the foil is made in the moulding cavity and places the two spaces in fluid communication as soon as it is produced, the aperture can be positioned precisely relative to the mould.

It should be specified that the phenomenon whereby humidity spreads by capillary action along the foil, in particular along the fibres when the foil is fibre-based, is generally known as the "wicking effect".

Although EP-A-0 724 942 describes a process which, in order to pass material through the foil, proposes cutting out the foil in the vicinity of the moulding cavity using a blade fixed to one of the mould parts, no aperture placing the two spaces in communication is produced in the cavity as soon as the cut-out is made.

On the other hand, EP-A-0 684 120 proposes stretching the foil over cavities in order to bring about cohesion between the covered portion and the non-covered portion. As long as the foil is not cut out, the structure of this foil bursts under the pressure of the material injected into the moulding cavity.

However, when the material starts to pass through the structure of the foil at given locations, a drop in pressure is noted or at least the pressure reaches a stage such that the passages remain localized. Consequently, the material passages cannot increase or at least cannot exist in a sufficiently large number. Therefore this solution proves complex, allowing only limited cohesion between the covered and non-covered portions and only reducing the "wicking effect" to a slight degree.

It should be noted that the invention aims to overcome the above problems, irrespective of the relative position of the covered and the non-covered portions. In particular, these two parts may be adjacent or the covered portion may surround the non-covered portion or vice versa. They may also be arranged such that their configuration is a combination of both these possibilities.

Furthermore, in order that the finished part has a satisfactory appearance, in particular the non-covered portion thereof, the invention proposes that during step d) and preferably also during step e) the plastics material is injected under pressure into the moulding cavity.

The finished part is then obtained directly without having to subject the part to an additional moulding operation in order to ensure that the non-covered portion has a satisfactory appearance.

In order to reduce the risk of blemishes on the finished part, the invention even advantageously proposes that:

during step d) a first injection stage be carried out in which the plastics material is injected under pressure opposite one side of the decorative area, such that the decorative area of the foil is brought to bear against one of the mould parts intended to receive it; and during step e) the first injection stage be continued so that the plastics material is made to pass through the apertures, and a further pressurized injection process be carried out in which plastics material is injected outside the decorative area.

Injecting the material first "below" (that is, opposite) the decorative area enables the foil to be positioned whilst shaping it in the moulding cavity. The second injection stage enables the flow of material resulting from the first injection stage to continue, which improves the appearance of the non-covered portion and enables a larger non-covered portion to be produced. Moreover, the second injection stage can be carried out at a higher pressure (preferably at between 20 and 40 MPa, depending on the material) in this non-covered portion in which the inset is not provided, whilst the pressure of the first injection stage is more moderate (preferably between a few MPa and 20 MPa).

According to a further feature of the invention, on the injection side, the decorative area is almost completely coated with plastics material before the foil is cut out during step c). Consequently, before cutting out, the decorative area can be held by means of the further area, in particular its tension can be controlled, so enabling the decorative area to be shaped satisfactorily. The almost complete coating of the decorative area enables this shape to be set, so preventing the decorative area of the foil deforming after the cutting-out process.

In order to produce a non-covered portion surrounded by a covered portion, the invention proposes that:

the first mould part comprise at least two components;

a recess (hole with a closed contour) be formed in the foil; and during step a), an area of the foil defining the periphery of this recess be introduced between the two components of the first mould part where the foil is held.

In order to further improve the part production process, in particular the positioning of the aperture in the mould cavity, the invention advantageously proposes that:

the first mould part comprise at least two components;

during step a), an area of the foil outside the decorative area be introduced between the two components of the first mould part; and that during step b), the mould be closed only partially, the mould being completely closed during step c) and producing the cut-out in the foil by exerting pressure between the first and second components of the first mould part.

Therefore the aperture is formed only when the shaping of the foil and in particular the shaping of the decorative area during closure of the mould is completed. From that moment, the risk of the aperture's moving in the moulding cavity and being located on the visible face is considerably reduced.

In order to further improve the formation of the aperture in the foil, the invention proposes that, during step b), the foil be placed between two components of a punch device and, during step c), an aperture be instantaneously formed through the foil by bringing the two components of the punch device into contact with each other.

The aperture is thus produced easily and positioned precisely in a reliable and rapid manner, which shortens the part production time.

In order to increase the diversity of the parts produced, the invention proposes that the two components of the punch device be held in contact with each other until step f). In this way, a finished part is produced which has a passage of which the shape can be determined by this punch.

In order to prevent parts of the foil showing on the visible face of the finished part at the portion which has not been moulded over, the invention proposes that, after step c), the injection of material opposite the decorative area and outside this decorative area be controlled such that, during the first and second injection stages, opposing forces be applied by material on either side of the further area, thus preventing its showing on the visible face of the finished part. By controlling the flow(s) of material, the aperture can be prevented from moving in the direction of the visible face.

As a further or alternative solution, the invention proposes that, after step c), an eddying effect be created in the immediate vicinity of the aperture cut out in the foil or the flow of material injected into the first space be held back against its natural movement towards the periphery of the second space, in order to prevent the further area of the foil showing on the visible face.

The above two solutions are all the more advantageous since, in order to prevent a wicking effect, as the foil is held on the mould in a foil-retention area outside the decorative area before step c), the foil is cut out continuously during step c) in order to separate the decorative area and the retention area. In fact, if these two areas are totally separate, no wicking effect at all is possible.

If the problem of the wicking effect is not of primary importance, the invention proposes that, as from step b), the foil be held on the mould in a foil-retention area outside the decorative area and, during step c), the foil be cut out discontinuously such that the foil is held at least until step f). In this way, the movements of the foil are better controlled and hence the quality of the appearance of the inset on the finished part is improved. This solution further prevents the cut-out appearing on the visible face.

In particular, according to an advantageous feature of the invention, after step c), the foil-retention area is held completely such that movement thereof is prevented.

The invention further concerns a finished part obtained by the above process. According to the invention, the finished part comprises a covered portion, in which a non-rigid decorative foil covers a visible face of a support part of plastics material, and a non-covered portion in which there is no decorative foil on the visible face, the covered portion completely surrounding the non-covered portion.

Together with the configurations already known, this configuration enables parts to be produced which have almost all the relative arrangements possible between the covered and non-covered portions.

In the following the invention will be explained in further detail with reference to the attached drawings, in which:

FIG. 1 shows in section a mould according to the invention during a first step of the process;

FIG. 2 shows in section a mould according to the invention during a second step of the process;

FIG. 3 shows in section a mould according to the invention during a third step of the process;

FIG. 4 shows on a larger scale the detail marked IV in FIG. 3, during a step preceding that shown in FIG. 3;

FIG. 5 shows on the same scale the detail marked IV in FIG. 3, during the same step as shown in FIG. 3;

FIG. 6 shows, still on the same scale, the detail marked IV in FIG. 3, during a subsequent step of the process;

FIG. 7 is a view in section along the line VII—VII of FIG. 6;

FIGS. 8 and 9 show variant embodiments of the mould in the detail part marked IV in FIG. 3;

FIG. 10 is a plan view of the foil used in FIGS. 11 to 13;

FIG. 13 shows on a larger scale the detail marked XIII in FIG. 12, during a third step of the process;

FIGS. 14 and 15 illustrate a further variant of the mould during two successive steps of the process;

FIG. 16 illustrates on a larger scale the detail marked XVI in FIG. 15, during a third step of the process;

FIGS. 17 to 22 show plan views of different parts obtained by the process of the invention.

Figure 11:
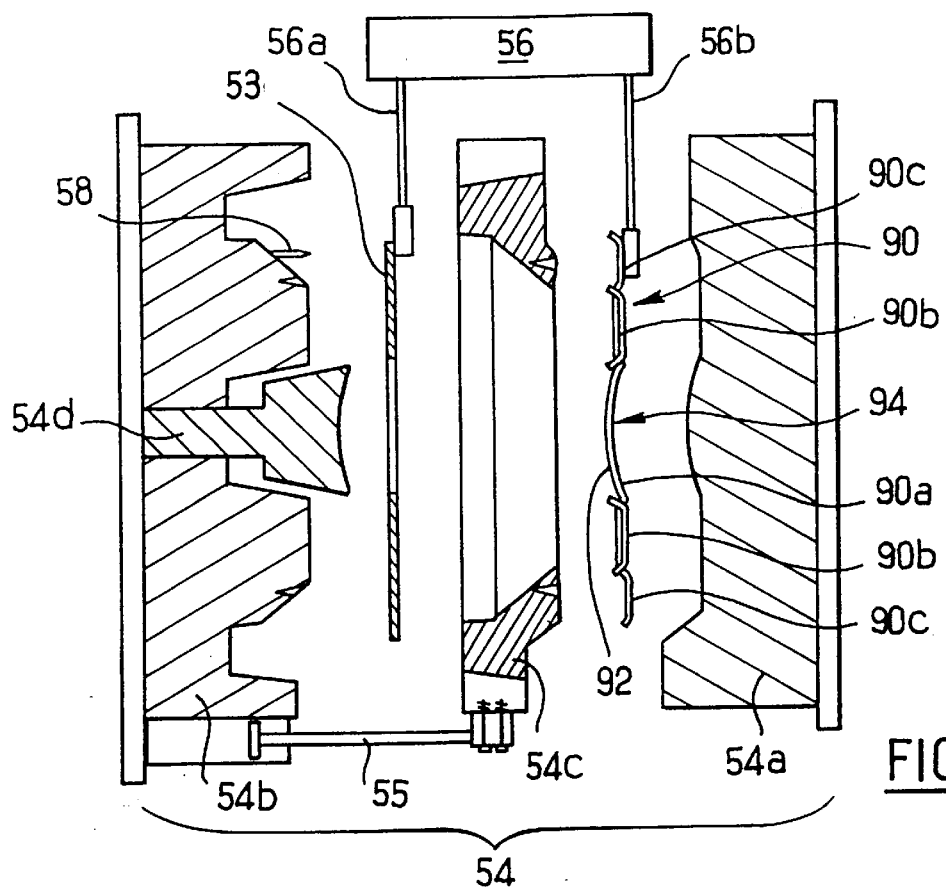
FIG. 11 shows a variant of the mould during a first step of the process.

FIGS. 1 to 3 illustrate a mould 4 comprising a first movable part 4a and a second part consisting of a fixed part 4b and a window 4c (frame-like block). In this case the window 4c is connected to the fixed part 4b by actuators 5. However, the window can alternatively be structurally connected to the movable part 4a of the mould by means of actuators or the like.

In FIG. 1 the mould 4 is in the open position; the movable part 4a and the fixed part 4b are far apart from each other and the window is in the extended position, not bearing on the fixed part.

A foil or sheet 2 is positioned between the fixed part 4b and the window 4c by a first arm 6a of a robot 6. The foil is then secured on pins 8 at the top or by any other holding means. The remainder of the foil is then positioned by gravity, the cutting plane being vertical.

In FIG. 2 the window is partially closed. There is still a spacing d between the window 4c and the fixed part 4b of the mould. The foil-retention means, consisting in particular of the pins 8 and the pinching of the foil between the window 4c and the fixed part 4b of the mould, are then active, that is, they hold a peripheral marginal retention area 2a of the foil 2. However, since the window is only closed partially, the foil is not completely immobilized, that is, it can slide relative to the retention means. The tension of the foil 2 is thus controlled.

Thermoplastics material 1, intended to serve as a support for the finished part, is then injected from the fixed part 4b of the mould into an inner space 16 located below the foil 2. As the space 16 fills, the mould is progressively closed by bringing the two parts 4a, 4b together such that the material 1 is injected and compressed.

At the end of the injection-compression phase, the movable part 4a of the mould bears against the window 4c. FIG. 4 shows that the mould 4, and in particular the window 4c, is not completely closed at this stage—the spacing d still separates the window 4c from the fixed part 4b. A space 20 remains around the foil 2, between the window 4c and the fixed part 4b. Thus, although the foil is held, controlled sliding thereof is still possible between the window and the part 4b.

When the space 16 has been completely or almost completely filled, as shown in FIG. 5, a central area 2c of the foil 2, which is to appear on the visible face of the finished part in order to constitute the inset there, is applied by the thermoplastics material 1 against the movable part 4a located opposite the first space 16. The central area 2c is surrounded by a connection area 2b which is in turn surrounded by the peripheral retention area 2a, the whole constituting the foil 2.

The mould has a cavity 17 comprising the space 16 and an outer space 18 surrounding the space 16. In this case these two spaces are separated by the connection area 2b of the decorative foil.

It is possible to detect the filling of the space 16 by measuring the volume of material injected or the opening of the mould or by using event sensors (pressure, heat flow, temperature or optical sensors or the like). When the space 16 is almost full, the order is given for the mould to be closed and the fixed part 4b and movable part 4a then move towards each other.

In FIGS. 3 and 5 the mould is completely closed, the moving together of the parts 4a and 4b having brought about the closure of the window 4c which is now in contact with the fixed part 4b. The shapes of the mould parts and of the window 4c are designed such that, during its movement towards the fixed part 4b, the movable part 4a comes to bear against the window 4c so as to push it until it comes into contact with the part 4b.

The window 4c comprises a projecting portion 12 forming a sharp edge in the manner of a "parrot's beak". At the boundary between the connection area 2b and the peripheral retention area 2a, this parrot's beak cuts out the foil 2 under the effect of the pressure of the complete closure of the mould 4. It is important that the foil 2 be cut out at least at the connection area 2b, that is, within or at the boundary of the moulding cavity in order to place the spaces 16 and 18 in communication.

In FIGS. 6 and 7 the foil 2 is only cut out partially. The connection area 2b, and hence the central area, are thus held since they are still connected by sections 2d to the retention area 2a. Total closure of the mould prevents the retention area 2a between the window 4c and the fixed part 4b of the mould from sliding. Therefore there is no risk of the connection area 2b being applied against the movable part 4a of the mould and appearing on the visible face of the finished part.

As concerns the cut-outs 2e they enable the space 16 and the outer space 18 to be placed in communication as soon as they are produced. The flow of material can thus continue from the space 16, covered by the inset, to the space 18 where the visible portion of the finished part will not be covered.

The material 1 is progressively injected via nozzles 10a, 10b, 10c, 10d and 10e from the centre of the central area 2c to the periphery thereof, then to the periphery of the non-covered portion of the part when the cut-outs 2e have been made in the foil. The space 16 is thus filled first by nozzles 10a then 10b and 10c, whilst the space 18 is subsequently filled using nozzles 10d and 10e.

This sequential injection process is brought about using the above-mentioned sensors, such as in particular event sensors, the order for material to be injected from a nozzle being given when the front of injected material arrives thereat. This front of material is controlled such that it moves continuously towards the periphery of the cavity 17, so preventing visible seams on the finished part.

Moreover, the injection pressure of the material 1 is advantageously higher at the end of the filling step, in particular when the material continues to flow only out of the nozzles 10d and 10e located in the space 18. In this way, the quality of the appearance of the non-covered face is improved—the higher the pressure, the better the quality of the appearance of the finished part and in particular the less visible the seams—without the risk of impairing the inset by too high an injection pressure.

FIG. 1 shows the finished part 40 partially covered on its visible face 44 by the foil 2 and held by a second arm 6b of the robot 6. Its support 42, consisting of the hardened thermoplastics material 1, having hardened, the finished part 40 is removed from the mould by moving apart the two mould parts. This figure does not show the means for the final cutting of the foil 2 enabling the retention area 2a to be separated from the finished part 40.

FIG. 8 shows a variant in which the connection area 2b has been completely cut off by the "parrot's beak" 22. (However, this cut-out may be partial, as shown in FIGS. 6 and 7).

The risk of the central zone 2c moving is reduced owing to the fact that, since the material 1 is first injected below the inset—in particular by a sequential injection process—the material has already cooled in this area and "hardened" when the foil is cut, that is essentially when the front of material arrives in the space 18. This helps to hold the inset and prevent its moving.

On the other hand, since the connection area 2b is no longer held by the retention area 2a, it has to be prevented from being able to appear on the visible face of the finished part. To this end, the movable part 14a of the mould has a rib 28 against which the edge of the central area 2c abuts in the space 16, this rib creating a step 30 in the space 18. The boundary between the spaces 16 and 18 is then defined by an imaginary line connecting the rib 28 and the parrot's beak 22.

The fixed part 4b also has a step 26, such that the space 18 has a widened area 34 delimited by the steps 26 and 30.

The length of the widened area 34 is slightly longer than that of the foil-connection area 2b.

By virtue thereof, the connection area 2b is prevented from moving to the visible face, for two reasons:

Firstly, the material 1 coming from the space 16 abuts the step 26 and assumes an eddying movement illustrated by the arrow 32 such that the material passes behind the connection area 2b so that it surrounds and immerses this area, up to the rib 28. This rib 28 prevents the material 1 penetrating between the inset 2c and the movable part 14a of the mould.

Secondly, if the material 1 is injected into the space 18 outside the widened area 34, as soon as the mould is completely closed (that is, as soon as the foil is cut), the flow of material from the space 18 will progress in the direction of the arrow 36 as far as the step 30 and be positioned between the movable part 14a of the mould and the connection area 2b. This connection area 2b will be immersed in the plastics material, between the flows of material 1 from the spaces 16 and 18. The seam line created by the meeting of the two flows is not a hindrance here since it does not appear on the visible face.

Moreover, the flows of material from the spaces 16 and 18 thus apply opposing forces to the foil. The stresses to which the foil is subject and which tend to move it towards the visible face are thus reduced.

FIG. 9 shows a secondary cavity 38 communicating with the general moulding cavity and formed in the fixed part 24b of the mould. The movable part of the mould 24a and the window 24c can be those illustrated previously. The foil can be cut out partially or completely.

This cavity 38 is formed at the edge of the space 16 and acts as a material "feeder", that is, an "overflow" reservoir. When the material 1 is injected into the space 16, the material spreads about the injection points 10a, 10b, 10c. In this way, the connection area 2b risks being impregnated with material at given locations before others. Therefore it is necessary to wait for the central area 2c to be almost completely coated with thermoplastics material before cutting the foil. The accumulation of material then causes a rise in the pressure of the material, causing material to pass through the connection area.

The secondary cavity 38 creates a clearance area for the material whilst waiting for the foil to be cut and so avoids material passing through the foil by preventing compression of the material as a result of its accumulating in part of the injection space. It thus enables the different filling levels of the space 16 to be balanced. At the end of the injection stage, the cavity 38 is completely filled with material.

FIGS. 10 to 13 illustrate a variant enabling a portion which is not covered by a decorative foil and is completely surrounded by a portion covered by a decorative foil to be produced. In these figures parts corresponding to those in the preceding figures are denoted by a reference number increased by 50.

In FIG. 11 the mould 54 essentially differs from the mould 4 only in that the fixed part 54b comprises a movable core 54d actuated by an actuator (not shown). The robot 56 introduces a foil 53 into the mould between the movable part 54a and the window 54c.

This foil 53 is illustrated in greater detail in FIG. 10. It has a recess 53a such that it forms a sort of collar between an inner edge 53b, delimiting the recess, and an outer edge 53c. About the recess the foil 53 comprises indents 53d which extend radially into the foil from the edge 53b.

The robot secures the foil at the top on the pins 58. The core 54d is then inserted through the recess 53a in the foil 53. The core 54d is then closed by moving it towards the fixed part 54b of the mould, such that an internal peripheral retention area 53f and in particular the inner edge 53a of the foil is disposed between the core 54d and the fixed part of the mould 54b.

Figure 12:
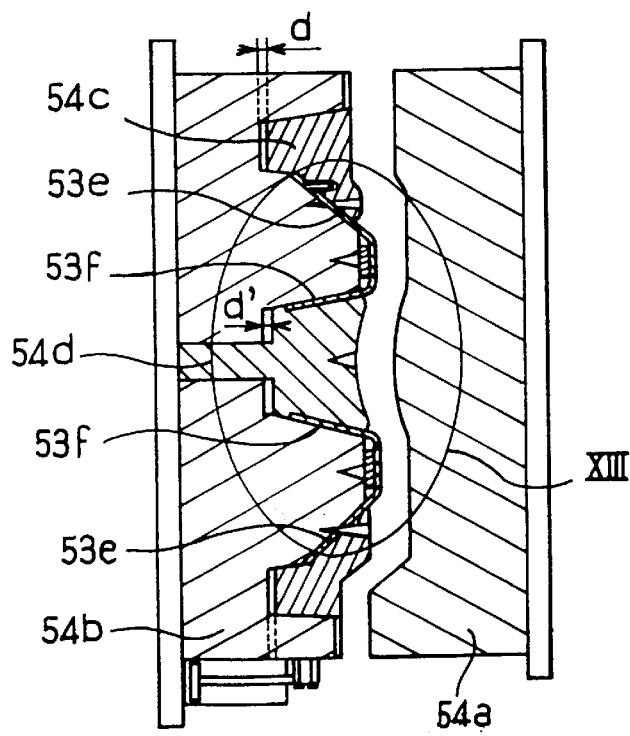
FIG. 12 shows the mould of FIG. 11 during a second step of the process.

As FIG. 12 illustrates, during closure of the core 54d, the internal area 53f is held relative to the core 54d, the internal area 53f then moves, substantially following the movement of the core 54d. Thus the indents 53d are located between the core 54d and the fixed part 54b of the mould. Consequently, the indents 53d facilitate positioning of the foil, preventing the foil 53 puckering when it is placed between the core 54d and the fixed part 54b, and risking showing on the finished part.

The window 54c is closed as described above in conjunction with the window 4c, substantially at the same time as the core 54d is closed. An outer peripheral retention area 53e and in particular the outer edge 53c are disposed between the window 54c and the fixed part 54b. The external area 53e can be held to a greater or lesser extent relative to the window 54c as described in conjunction with the core 54d, in order to apply the desired tension to the foil 53.

The core 54d is then only closed partially; as with the window 54c, there is a spacing d' (substantially equal to d) between the core and the fixed part 54b.

The moulding cavity 67 thus has three spaces 66, 68 and 69 continuously separated by the foil 53, as shown in FIG. 13. The plastics material 51 is then injected into the space 66, bringing a decorative area 53g of the foil into abutment against the movable part 54a of the mould. It will be appreciated that the situation in the areas marked A and D corresponds to what was described previously in conjunction with the detail IV. It will also be appreciated that the areas marked B and C are similar to the areas marked D and A, respectively, the core 54d then playing a similar role to that of the window 54c. Since the subsequent steps enabling the finished part 90 to be obtained are consequently similar to those already described, they will not be explained again.

As shown in FIG. 11, the finished part 90 has a visible face 94 and comprises a plastics material support part 92 covered by the decorative foil 53 on the portion 90b of the part, which surrounds the non-covered portion 90a and is surrounded by the non-covered portion 90c.

FIGS. 14 to 16 illustrate a variant for producing an aperture in a foil. In these figures a mould 104 comprises a fixed part 104b and a movable part 104a, between which is formed a moulding cavity 117. The two mould parts are at least partially closed. A foil 102 is disposed between these two mould parts and in particular in the mould cavity 117.

An anvil 107a is disposed inside the movable part 104a and delimits the moulding cavity 117 therein. A hammer 107b comprising a cutting part 107d is disposed inside the fixed part 104b, at the boundary of the moulding cavity 117 and opposite the anvil 107a. The hammer 107b slides relative to the fixed part 104b. In order to reduce the wear of the fixed part 104b, a plunger 107c is placed between the fixed part 104b and the hammer 107b. The assembly formed by the hammer 107b and the anvil 107a forms a punch device, that is, the moving together of the hammer 107b and the anvil 107a brings about the cutting of the foil 102 when it is disposed therebetween.

The foil continuously separates the moulding cavity 117 into a first cavity 116, at the boundary of which the hammer 107b is disposed, and a second cavity 118 at the boundary of which the anvil 107a is disposed.

In FIG. 15 the bringing into contact of the projecting part 107d of the hammer 107b and the anvil 107a produces an aperture 102a (illustrated in FIG. 16) in the foil 102 so that the spaces 16 and 18 are immediately placed in fluid communication. This aperture surrounds a blocked-out area 102b of the foil. The contact between the hammer and the anvil is advantageously brought about along a discontinuous line. Consequently, the cut-out is discontinuous and produces an aperture 102a formed by a plurality of passages through the foil 102. However, the cut-out could also be continuous.

As shown in FIG. 16, the hammer 107b and the anvil 107a are then held in contact with each other whilst plastics material 101 is injected into the spaces 116 and 118 and until the part cools. Thus there is no plastics material 101 opposite or on either side of the blocked-out area 102b of the foil.

After cooling, it is easy to remove the blocked-out area 102b of the foil, so creating a continuous passage (hole) 146 from one side to the other of the finished part 140, illustrated in FIG. 17. The edge of this passage has a good appearance on the side with the visible face 144 since it has the appearance of a collar 148 of plastics material concealing the cut-out in the foil.

As a variant, it is possible to offset or move the anvil 107a and the hammer 107b when the foil has been cut out so that they enable the blocked-out area 102b to be immersed in the plastics material. This produces a finished part composed of a moulded-over portion and a non-moulded-over portion which has no passage therethrough.

It will be appreciated that the invention can produce the finished part shown in FIG. 18 since it differs from the part shown in FIG. 17 only in that the passage 146 is formed at the edge of the finished part.

FIG. 19 shows the visible face of the part 40 of FIG. 1, the decorative foil 2 being completely surrounded by the non-covered portion of the support 42.

Figure 20:
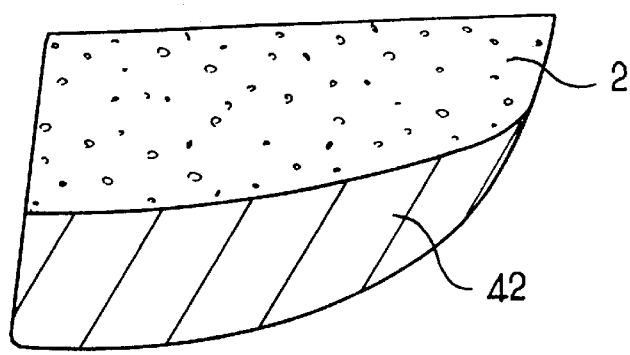

FIG. 20 illustrates a variant of FIG. 19 which can also be produced by the process according to the invention. The covered and uncovered portions are adjacent here.

Figure 21:
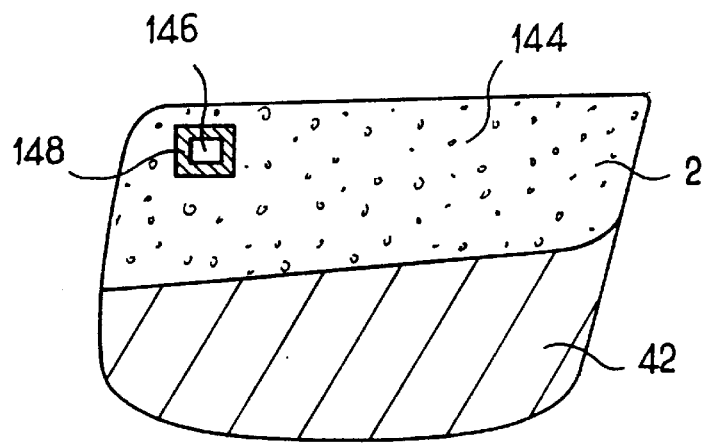

FIG. 21 shows a part comprising a support part 42 which is not covered and a part which is covered by a decorative foil 2. The covered part has a passage 146 surrounded by a collar 148 made of plastics material and produced on the visible face 144. To a certain extent, this is a combination of the illustrations of FIGS. 17 and 20.

Figure 22:
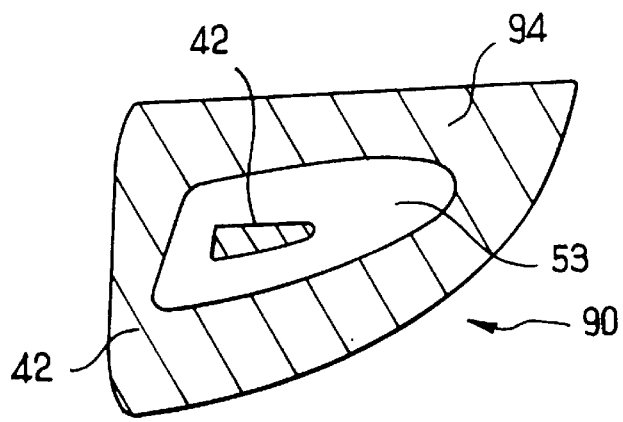

FIG. 22 shows the visible face 94 of the finished part 90 of FIG. 11. The decorative foil 53 surrounds a non-covered portion of the support 42 and is surrounded by a further non-covered portion of the support.

It will be appreciated that the invention is in no way restricted to the embodiments described above. Thus, the window could be structurally connected to the movable part of the mould, without thereby modifying the process for producing the finished part. In particular, the window and the fixed part of the mould could be operatively connected.

The foil could also be preshaped in order to impart thereto greater rigidity and/or an initial shape which facilitates the positioning of the foil in the mould—cf. in particular GB-A-2 271 956—for example by interlocking.

We claim:

1. Process for substantially covering a visible face of a support part of plastic material with at least one non-rigid decorative foil, in a mould substantially comprising first and second mould parts which form a moulding cavity therebetween, to produce a decorative support part having a decorative inset, the process comprising the following steps:
    a) inserting into the mould the foil which comprises a decorative area, intended to form the inset, and a further area;
    b) closing the mould at least partially by moving the two mould parts together such that the foil creates a continuous separation of the moulding cavity into a first space and a second space;
    c) inside the moulding cavity, cutting the foil discontinuously to form discrete apertures therein at the location of the further area, whereby the first and second spaces of the cavity are placed in fluid communication by the apertures which henceforth interrupts the separation between said first and second spaces so as to enable the plastic material to pass through the apertures, leaving a cut end of the foil in the moulding cavity;
    d) before and/or after steps b) and/or c), introducing plastic material into the moulding cavity; and
    e) after step c), distributing the plastic material in the moulding cavity by passing the plastic material through the apertures in order to produce the decorative support part locally covered by the inset with the cut end of the foil immersed in and immobilized by the plastic material.

2. Process according to claim 1, wherein during step d), the plastic material is injected under pressure into the moulding cavity.

3. Process according to claim 2, wherein:
    during step d) a first injection stage is carried out in which plastic material is injected under pressure at a side of the decorative area, such that the decorative area of the foil is brought to bear against one of the mould parts intended to receive the foil; and
    during step e) the first injection stage is continued so that the plastic material is made to pass through the apertures, and a second injection stage is carried out in which plastic material is injected outside the decorative area and contacts the material of the first injection stage.

4. Process according to claim 3, wherein the side of the decorative area where the plastic material is injected is almost completely coated with plastic material before the foil is cut out during step c).

5. Process according to claim 3, wherein after step c), the injection of material at the decorative area and outside the decorative area is controlled such that, during the first and second injection stages, opposing forces are applied by material on either side of the further area, thus preventing showing of the further area of the foil on the visible face of the finished part.

6. Process according to claim 1, wherein:
    The first mould part comprises at least two components;
    a recess is formed in the foil; and
    during step a), an area of the foil defining the periphery of the recess is introduced between the two components of the first mould part where the foil is held.

7. Process according to claim 1, wherein:
    the first mould part comprises at least two components;
    during step a), an area of the foil outside the decorative area is introduced between the two components of the first mould part; and
    during step b), the mould is only closed partially, the mould being completely closed during step c) and producing the apertures in the foil by exerting pressure between the first and second components of the first mould part.

8. Process according to claim 1, wherein during step b), the foil is placed between two components of a punch device formed on the first mould part and the second mould part, and, during step c), a punch aperture is formed instantaneously through the foil by bringing the two components of the punch device into contact with each other.

9. Process according to claim 8, wherein the two components of the punch device are held in contact with each other until after step e).

10. Process according to claim 1, wherein the first space is located at the decorative area; and in that after step c), there is created in the immediate vicinity of the apertures in the foil an eddying effect or the flow of material injected into the first space is held back against the natural movement of the flow of material injected towards the periphery of the second space in order to prevent the further area of the foil showing on the visible face.

11. Process according to claim 1, wherein after step c), the foil-retention area is held completely such that movement thereof is prevented.

12. Process for substantially covering a visible face of a support part of plastic material with at least one non-rigid decorative foil, in a mould substantially comprising first and second mould parts which form a moulding cavity therebetween, to produce a decorative support part having a decorative inset, the process comprising the following steps:

a) inserting into the mould the foil which comprises a decorative area, intended to form the inset, and a further area;

b) closing the mould at least partially by moving the two mould parts together such that the foil creates a continuous separation of the moulding cavity into a first space and a second space;

c) inside the moulding cavity, cutting the foil discontinuously to form discrete apertures therein at the location of the further area, whereby the first and second spaces of the cavity are placed in fluid communication by the apertures which henceforth interrupts the separation between said first and second spaces so as to enable the plastic material to pass through the apertures, leaving a cut end of the foil in the moulding cavity;

d) before and/or after steps b) and/or c), introducing plastic material into the moulding cavity; and e) after step c), distributing the plastic material in the moulding cavity by passing the plastic material through the apertures in order to produce the decorative support part locally covered by the inset, wherein from step b) until after step e), the foil is held at least partially on the mould in a foil-retention area outside the decorative area until a cut end of the foil is immersed in and immobilized by the plastic material.

13. Process for substantially covering a visible face of a support part of plastic material with at least one non-rigid decorative foil, in a mould substantially comprising first and second mould parts which form a moulding cavity therebetween, to produce a decorative support part having a decorative inset, the process comprising the following steps:

a) inserting into the mould the foil which comprises a decorative area, intended to form the inset, and a further area;

b) closing the mould at least partially by moving the two mould parts together such that the foil creates a continuous separation of the moulding cavity into a first space and a second space;

c) inside the moulding cavity, cutting the foil to form at least one aperture therein at the location of the further area, whereby the first and second spaces of the cavity are placed in fluid communication by the at least one aperture which henceforth interrupts the separation between said first and second spaces so as to enable the plastic material to pass through the at least one aperture, leaving a cut end of the foil in the moulding cavity;

d) before and/or after steps b) and/or c), introducing plastic material into the moulding cavity; and e) after step c), distributing the plastic material in the moulding cavity by passing the plastic material through the at least one aperture in order to produce the decorative support part locally covered by the inset, wherein during step d), a first injection stage is carried out in which plastic material is injected under pressure at the decorative area, such that the decorative area of the foil is brought to bear against one of the mould parts intended to receive the decorative area; and during step e), the first injection stage is continued so that the plastic material is made to pass through the at least one aperture and a second injection stage is carried out in which plastic material is injected under pressure outside the decorative area and contacts the material of the first injection stage.

14. Process for substantially covering a visible face of a support part of plastic material with at least one non-rigid decorative foil, in a mould substantially comprising a first and second part which form a moulding cavity therebetween, so as to obtain a finished part comprising a decorative inset, the process comprising the following steps:

a) inserting into the mould the foil which comprises a decorative area, intended to form the inset, and a further area;

b) closing the mould at least partially by moving the two mould parts together such that the foil creates a continuous separation of the moulding cavity into a first space and a second space;

c) inside the moulding cavity, cutting at least one aperture in the foil at the location of the further area, such that the first and second spaces of the cavity are placed in fluid communication by the at least one aperture which henceforth interrupts the separation between these two spaces so as to enable the plastic material to pass through the at least one aperture, leaving a cut end of the foil in the moulding cavity;

d) before and/or after steps b) and/or c), introducing plastic material into the moulding cavity by injecting the plastic material into the moulding cavity under pressure; and e) after step c), distributing the plastic material in the moulding cavity by passing the plastic material through the at least one aperture in order to obtain the decorative support part locally covered by the inset, wherein the cut end of the foil is immersed in the plastic material, wherein during step d) a first injection stage is carried out in which plastic material is injected under pressure at a side of the decorative area such that the decorative area of the foil is brought to bear against one of the mould parts intended to receive the foil; and wherein during step e) the first injection stage is continued so that the plastic material is made to pass through the at least one aperture, and a second injection stage is carried out in which plastic material is injected outside the decorative area and contacts the material of the first injection stage.

15. Process according to claim 14, wherein the side of the decorative area where the plastic material is injected is almost completely coated with plastic material before the foil is cut out during step c).

16. Process according to claim 14, wherein after step c), the injection of material at the decorative area and outside the decorative area is controlled such that, during the first and second injection stages, opposing forces are applied by material on either side of the further area, thus preventing showing of the further area of the foil on the visible face of the finished part.

17. Process according to claim 14, wherein:

the first mould part comprises at least two components;

a recess is formed in the foil; and during step a), an area of the foil defining the periphery of the recess is introduced between the two components of the first mould part where the foil is held.

18. Process according to claim 14, wherein:

the first mould part comprises at least two components;

during step a), an area of the foil outside the decorative area is introduced between the two components of the first mould part; and during step b), the mould is only closed partially, the mould being completely closed during step c) and producing the at least one aperture in the foil by exerting pressure between the first and second components of the first mould part.

19. Process according to claim 14, wherein during step b), the foil is placed between two components of a punch device formed on the first mould part and the second mould part, and, during step c), a punch aperture is formed instantaneously through the foil by bringing the two components of the punch device into contact with each other.

20. Process according to claim 19, wherein the two components of the punch device are held in contact with each other until after step e).

21. Process according to claim 14, wherein the first space is located at the decorative area; and in that after step c), there is created in the immediate vicinity of the aperture in the foil an eddying effect or the flow of material injected into the first space is held back against the natural movement of the flow of material injected towards the periphery of the second space in order to prevent the further area of the foil showing on the visible face.

22. Process according to claim 16, characterized in that before step c), the foil is held on the mould in a foil-retention area outside the decorative area and the foil is cut continuously during step c) in order to separate the decorative area and the retention area.

23. Process according to claim 14, characterized in that as from step b), the foil is held on the mould in a foil-retention area outside the decorative area and, during step c), the foil is cut out discontinuously such that the foil is held at least partially until after step e).

24. Process according to claim 19, wherein before step c) the foil is held on the mould in a foil-retention area outside the decorative area and the foil is cut continuously during step c) in order to separate the decorative area and the retention area.

* * * * *